(12) United States Patent
Niewrzoll et al.

(10) Patent No.: US 12,285,812 B2
(45) Date of Patent: Apr. 29, 2025

(54) DEVICE FOR MACHINING WINDOW OR DOOR FRAMES WELDED FROM PROFILE PIECES

(71) Applicant: Rotox Holding GmbH & Co. KG, Brechen (DE)

(72) Inventors: Christof Niewrzoll, Waldbrunn (DE); Peter Zimmer, Grenderich (DE)

(73) Assignee: Rotox Holding GmbH & Co. KG, Brechen (DE)

( * ) Notice: Subject to any disclaimer, the term of this patent is extended or adjusted under 35 U.S.C. 154(b) by 577 days.

(21) Appl. No.: 17/606,552

(22) PCT Filed: Aug. 27, 2020

(86) PCT No.: PCT/EP2020/073916
§ 371 (c)(1),
(2) Date: Oct. 26, 2021

(87) PCT Pub. No.: WO2021/037950
PCT Pub. Date: Mar. 4, 2021

(65) Prior Publication Data
US 2022/0212274 A1 Jul. 7, 2022

(30) Foreign Application Priority Data
Aug. 29, 2019 (DE) ...................... 10 2019 123 144.2

(51) Int. Cl.
*B23C 3/12* (2006.01)
*B23Q 1/54* (2006.01)
(Continued)

(52) U.S. Cl.
CPC ............ *B23C 3/128* (2013.01); *B23Q 1/5406* (2013.01); *B23Q 39/024* (2013.01);
(Continued)

(58) Field of Classification Search
CPC ......... B23C 1/12; B23C 3/128; B23Q 39/021; B23Q 2039/004; B23Q 39/024;
(Continued)

(56) References Cited

U.S. PATENT DOCUMENTS 7,354,227 B2 * 4/2008 Ramnauth ............... B23P 23/02
408/69
7,954,216 B2 * 6/2011 Sturm .................. B23Q 39/024
144/35.2
(Continued)

FOREIGN PATENT DOCUMENTS

CN 202824779 U * 3/2013
CN 105057750 A * 11/2015
(Continued)

OTHER PUBLICATIONS

EPO Machine Translation of DE 10213778 A1—Baumann, Ulrich; "Machine Tool With Rotatable Multiple Tool Carrier Has Tool Carrier Head Axis Running Transversely to Plane Passing Through Transverse Motion Axis and Longitudinal Motion Axis" Oct. 2 (Year: 2003).*

*Primary Examiner* — Sunil K Singh
*Assistant Examiner* — Michael Vitale
(74) *Attorney, Agent, or Firm* — Rogowski Law LLC

(57) ABSTRACT

The invention relates to a device for machining frames welded from profile pieces such as window or door frames made of plastic, said device comprising at least one machining head and machining tools which are mounted thereon and can be delivered to the relevant machining position on the frames. The machining head can be pivoted around an axis and has a positioning shaft which is mounted at an angle with respect to the pivot axis and on which the machining tools are mounted. The positioning shaft extends on both (Continued)

sides of the machining head with machining tools at both end regions of the positioning shaft.

11 Claims, 7 Drawing Sheets

(51) Int. Cl.
*B23Q 39/02* (2006.01)
*B23Q 39/00* (2006.01)

(52) U.S. Cl.
CPC ..... *B23Q 2039/004* (2013.01); *Y10T 29/5107* (2015.01); *Y10T 409/304144* (2015.01); *Y10T 409/307672* (2015.01); *Y10T 409/308232* (2015.01); *Y10T 409/50246* (2015.01)

(58) Field of Classification Search
CPC .... B25J 15/0057; Y10T 409/304144–304256; Y10T 409/307672; Y10T 409/308232; Y10T 409/501476; Y10T 409/50246; Y10T 29/5107
USPC ....... 409/138, 139, 140, 201, 211, 297, 303; 29/26 A
See application file for complete search history.

(56) References Cited

U.S. PATENT DOCUMENTS

| | | | |
|---|---|---|---|
| 10,414,051 B2 * | 9/2019 | McGlinchy | B25J 9/1674 |
| 2005/0141974 A1 * | 6/2005 | Jaegg | B23C 3/128 |
| | | | 409/138 |
| 2007/0234550 A1 | 10/2007 | Eisenbach | |
| 2011/0140330 A1 * | 6/2011 | Nishikawa | B23K 9/02 |
| | | | 269/55 |
| 2015/0063936 A1 | 3/2015 | Azzarello | |
| 2018/0333790 A1 * | 11/2018 | Urban | B23Q 39/024 |
| 2019/0184515 A1 | 6/2019 | Diehl | |

FOREIGN PATENT DOCUMENTS

| | | | | |
|---|---|---|---|---|
| DE | 10213778 A1 | 10/2003 | | |
| DE | 102016006791 A1 | 12/2017 | | |
| EP | 1291101 A2 | 3/2003 | | |
| EP | 2500133 A1 * | 9/2012 | ........... | B23Q 39/021 |
| FR | 2875165 A1 * | 3/2006 | ............. | B23C 3/128 |
| WO | 2015031793 A1 | 3/2015 | | |

* cited by examiner

DEVICE FOR MACHINING WINDOW OR DOOR FRAMES WELDED FROM PROFILE PIECES

CROSS-REFERENCE TO RELATED APPLICATIONS

This application is a national stage application (under 35 USC § 371) of PCT/EP2020/073916, filed Aug. 27, 2020, which claims benefit of German application No. 10 2019 123 144.2, filed Aug. 29, 2019, the contents of each of which are incorporated by reference herein.

BACKGROUND OF THE INVENTION

Technical Field and State of the Art

The invention relates to a device for machining frames welded from profile pieces such as, for instance, window or door frames made of plastic, comprising at least one machining head and machining tools which are arranged on it and which can be moved into the appropriate machining position on the frames.

Such a machining device is disclosed, for example, in U.S. Pat. Appln. No. 2007/0234550 A1. This device has several machining tools that are held in a tool carrier which, in turn, can be moved in two directions that are perpendicular to each other. In addition, there is a second movable tool carrier that is arranged to the side of the tool carrier and that has a machining tool for purposes of machining a profile leg of the window frame. The second tool carrier can be moved in the diagonal direction of the frame corner that is clamped in the machine, so that the corner of the frame as well as a profile leg can be machined with one single machine.

International patent application WO 2015/031793 A1 discloses a window machining unit having a drive that is held on a robot arm and that, on its opposing and projecting drive shafts, has a socket for tools such as, for example, a sawblade on one side and a milling cutter or a drill bit on the other side. Since the machining unit is arranged on a robot arm, the tools can be moved in all three spatial directions and can also be rotated.

A drawback of the prior-art devices is the design effort needed so that the tools situated on a robot arm can be moved and rotated, or the effort needed to arrange a second movable tool carrier and the relatively small number of tools as well as the high effort in terms of the programming and software required for positioning the tools.

Before this backdrop, the invention is based on an objective of refining a device of the above-mentioned type in such a way that, with a simple construction and a reliable operation, it is possible to machine the corner joints of the frames as well as to machine the frame legs, for example, in order to create profiled through holes, drilled holes and the like.

SUMMARY OF THE INVENTION

The device according to the invention for machining frames welded from profile pieces such as, for instance, window or door frames made of plastic, comprises at least one machining head with machining tools which are arranged on it and which can be moved into the appropriate machining position on the frame that is to be machined.

The machining head can be swiveled around an axis and has one positioning shaft which is arranged at an angle to this swiveling axis and on which the machining tools are arranged.

Since the machining head can be swiveled and the positioning shaft that holds the tools can be rotated, the machining of a corner of the frame as well as the machining of a profile leg can be carried out by one single device and in one single clamping position of the frame. For instance, in order to machine a frame corner, the machining head is moved into the initial position and then aligned diagonally to the frame corner by swiveling the machining head around the swiveling axis using its positioning shaft that holds the machining tools. The desired machining tool is selected by rotating the positioning shaft and then the outer and/or inner corner as well as the visible surfaces are machined by moving the machining head towards and/or away from the frame corner. Once the frame corner has been finished, for example, by employing other machining tools, then a frame leg or profile leg can be machined. For this purpose, the machining head can be moved or brought into its initial position, then it can be aligned perpendicular to the profile leg that is to be machined by being swiveled around the swiveling axis using the positioning shaft, after which the desired tool can be selected by rotating the positioning shaft and can be brought into the working position by being moved or placed onto the profile leg.

In the case of water slits or other such through holes, for instance, in order to drill holes, the machining head can be moved along the frame leg together with the machining tool that engages with the appertaining frame leg. It goes without saying that the reverse mode of operation is likewise possible, whereby firstly the frame leg and subsequently the frame corners are machined, and a combination of the machining steps is also conceivable.

This attains a complete machining of window and door frames.

The device according to the invention entails a high degree of flexibility. Machining on the profile section or frame leg can be easily achieved from a technical standpoint.

According to a first embodiment, it is provided that the positioning shaft with the machining tools arranged on it can be positioned in the rotational direction by means of an actuating drive. As a result, a fast and precise selection of the appertaining machining tool can be made and the tool can be precisely moved into place on the frame corner or on the specific frame leg that is to be machined.

Preferably, the swiveling axis and the axis of the positioning shaft are aligned essentially perpendicular to each other, so that all of the machining positions on the frame and on the frame corner can be reached. Preferably, the swiveling axis runs perpendicular to the clamping plane of the frame, whereas the axis of the positioning shaft runs parallel to the plane of the frame.

According to another embodiment of the invention, it is provided that the machining head can be additionally moved in three axes and it is preferably held on a carriage that can be moved in three axes. In this manner, the carriage with the machining head can be placed diagonally relative to the clamping plane of the frame, which further enhances the universal deployment of the device. Thus, every position on the frame can be reached using a wide array of tools.

According to the invention, it is provided for the positioning shaft to extend on both sides of the machining head and to have machining tools at both end areas of the positioning shaft. As a result, a plurality of tools can be arranged at the ends of the positioning shaft so as to machine a wide array of frame geometries and frame specifications when it comes to through holes and drilled holes on the frame leg. The arrangement of various tools at opposite ends of the positioning shaft yields a compact structure and a large number of tools can be installed. This also allows complete machining of a crosswise section of the frame.

Another idea of the invention provides for the positioning shaft to be configured so that it can be adjusted relative to the machining head in one axial direction. This accounts for even more universal positioning possibilities for the machining tools, even at places of the frame that are otherwise difficult for the machine to access. In this context, the tool can be arranged on tool carriers arranged at both ends of the positioning shaft, as a result of which the device can be adapted to any dimensions of the profile pieces and to different requirements.

Of course, it is also conceivable to provide for stationary and/or motor-driven tools, which likewise increases the versatility of the machining possibilities.

In this context, the axes of the machining tools can be aligned perpendicular or parallel to the axis of the positioning shaft, which reduces the possibility of a collision between the frame that is to be machined and tools that are not currently needed.

The same goal is also pursued by the measure according to the invention in which one of the tools, at least in one rotational direction of the associated end of the positioning shaft, projects relative to the machining head, at least in certain areas, so that the appertaining machining tool can be used freely without a collision occurring between the machining head and the workpiece.

It is especially advantageous according to the invention for at least one motor-powered drive, especially an electric drive, to be provided for the machining tools, said drive having a continuous output shaft and having tool holders for rotating machining tools arranged at both shaft ends. As a result, tool holders that are located at opposite sides of the output shaft and that serve to hold rotating machining tools can be provided on one shared drive, a measure which considerably reduces the technical effort needed to drive the machining tools.

In the eventuality that at least two motor-powered drives for machining tools are provided at the ends of the positioning shaft, then, according to the invention, these tools are arranged one behind the other in the axial direction of the positioning shaft, and their tool axes are aligned with respect to each other at an angle, preferably at a right angle. This translates into a particularly compact structure, without the tools that are not being used at that moment colliding with the workpiece.

The positioning shaft is preferably positioned employing computerized numerical control (CNC), so that the tool can be positioned without pneumatics and only by means of the CNC program, thus yielding a high degree of precision and reproducibility.

When it comes to achieving a very short cycle time during the machining of frames, it is provided for at least two machining heads to be provided that preferably simultaneously machine the corners and/or side profiles of the frame. Naturally, it is also conceivable for two machining tools to be provided on both sides of the frame that is to be machined, so that an additional reduction of the cycle time for the machining of frames can be achieved.

Additional objectives, advantages, features and application possibilities of the present invention can be gleaned from the description below of several embodiments making reference to the drawing. In this context, all of the described and/or depicted features, either on their own or in any meaningful combination, constitute the subject matter of the present invention, also irrespective of their compilation in the claims or in the claims to which they refer.

BRIEF DESCRIPTION OF THE DRAWINGS

In this context, the following is shown, at times schematically.

DESCRIPTION OF THE DISCLOSURE

Figure 1:
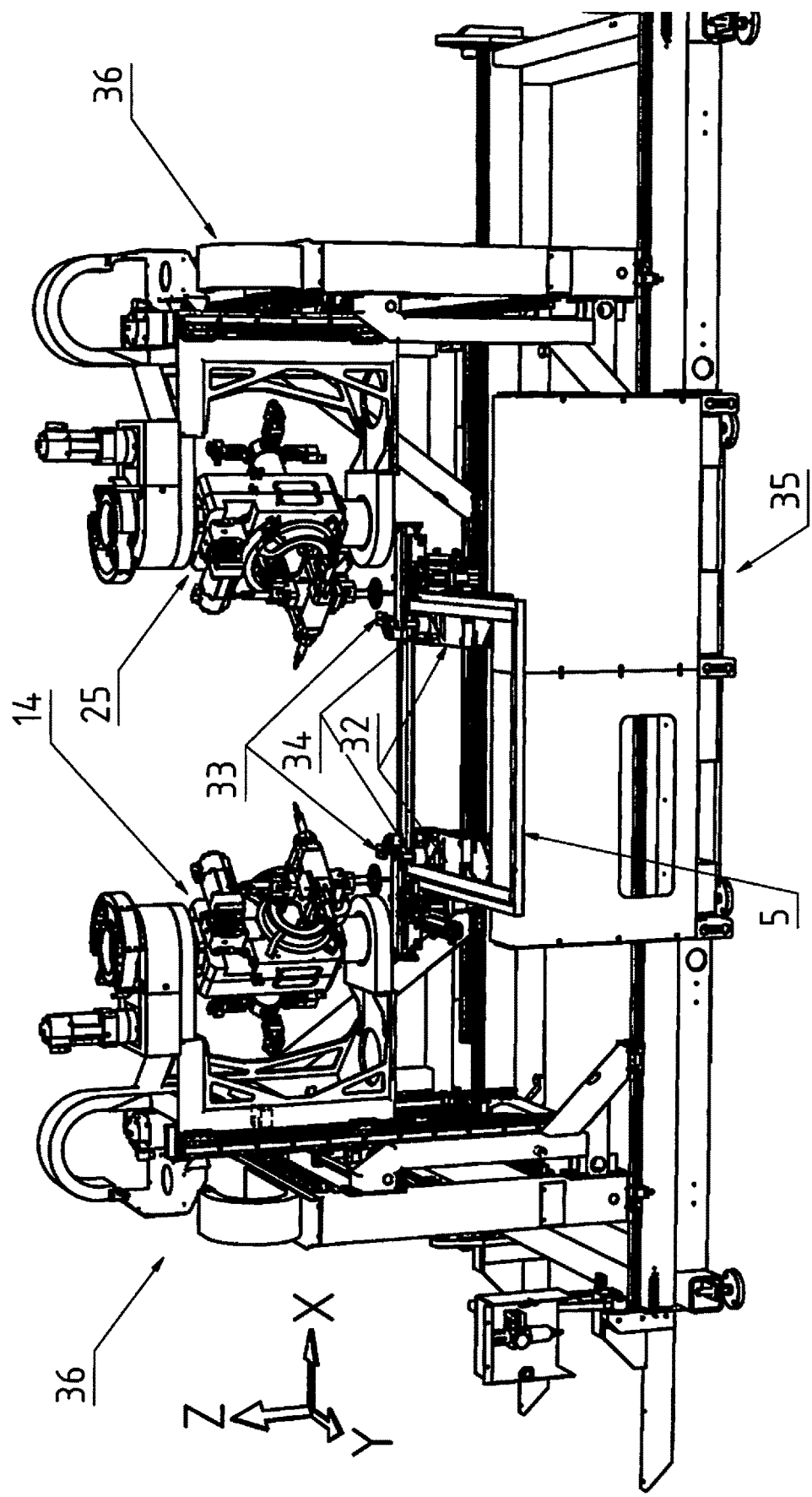
FIG. 1 a possible device for machining frames, comprising two carriages in an initial position, FIG. 2 an enlarged view of a machining head according to FIG. 1, FIG. 3 a partial view of the device shown in FIG. 1, comprising machining heads and the clamping of a profile in an initial position, FIG. 4 the device as shown in FIG. 3, in the working position for the inner corner machining, FIG. 5 another working position of the device for milling the inner corner, FIG. 6 the device as shown in the preceding figures, in a working position for machining a profile leg or a crosswise section of the frame, and FIG. 7 the device as shown in the preceding figures, in a working position for machining a lengthwise section of the frame.

The FIG. 1 shows an overall view of a device for machining the corner area of window or door frames 5, whereby said device makes it possible to machine the frame corner as well as the profile leg in the same initial position of the frame 5.

The frame 5 consists of plastic profile pieces or frame legs 1, 2, 3, 4 that have lengthwise sections and crosswise sections and that have first been mitered and subsequently welded at the corners. The weld that has been created by the welding procedure and that needs to be machined already for optical reasons runs in the area of a corner at an angle of 45° relative to frame legs or profile pieces 1 to 4 that have been joined together.

Figure 2:
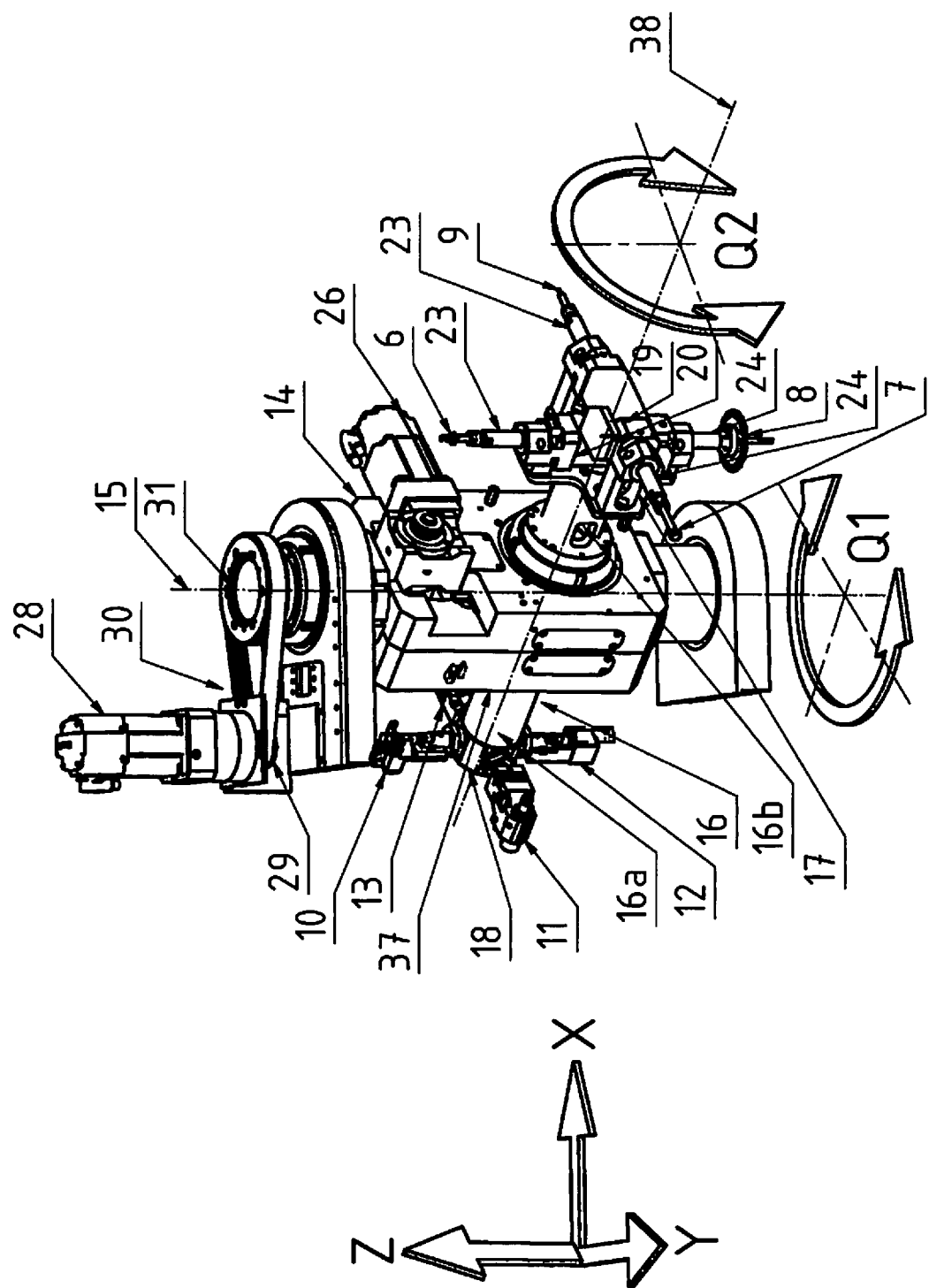

The corner joint is machined by means of milling, chiseling or, for example, drilling tools 6 to 13. In order to move the machining tools 6 to 13 into the working position at the specific corner areas of the frame 5 that are to be machined, the machining tools 6 to 13 have to be movable in a socket of the machining device horizontally or parallel to a clamping plane 27 of the frame 5 in the XY-direction as well as in the Z-direction perpendicular to the clamping plane 27. The X-, Y- and Z-directions are each depicted in FIGS. 1 and 2. In addition, the rotational or swiveling directions Q1 and Q2 are indicated in FIG. 2.

Towards this end, there are two carriages 36 that can be moved in the X-direction and that are situated in a machine rack 35, and each carriage holds a machining head 14, 25 that can be moved in three spatial directions. It is likewise conceivable for two machining heads 14, 25 that are used on one side of the frame to each be arranged on the carriage 36. The carriage 36 can be moved by means of linear actuators such as stepping motors or spindle motors, or else, for example, by compressed air-powered piston cylinder units. The movement of the machining head 14, 25 can effectuate the machining of the top as well as of the bottom of the clamped frame 5.

The machining tools employed in the embodiment selected here comprise not only stationary tools 10 to 13 such as, for instance, chiseling blades to remove the weld beads that have formed in the corner area of the frame 5 during welding, but also rotating tools 6 to 9 such as, for example, drills to create a sealing groove, side-and-face cutters to ablate the weld bead on the outer corner of the frame 5 and the like.

The machining tools 6 to 9 are employed to machine profile legs or profile pieces 1 to 4, for example, in order to drill holes into the outside of the profile legs or to create elongated holes.

The machining head 14, which is mounted, for instance, on a movable carriage 36 as shown in an enlarged view in FIG. 2, can be swiveled around a vertical axis 15 in the embodiment selected here, as illustrated by the double-headed arrow labelled Q1 in FIG. 2. For this purpose, an actuating drive 28 is arranged on the carriage 36 or support which, in the embodiment selected here, uses a toothed belt 30 to effectuate the swiveling of the machining head 14 relative to the carriage 36.

The actuating drive 28 can have, for instance, an electric motor which, by means of a sprocket 29 arranged on its output shaft, drives the toothed belt 30 which swivels the machining head 14 around the swiveling axis 15 by means of a toothed wheel 31.

A positioning shaft 16 on which the machining tools 6 to 13 are arranged is likewise mounted in the machining head 14. The positioning shaft 16 can be adjusted in the rotational direction by means of an actuating drive 26. In the embodiment selected here, the swiveling axis 38 of the positioning shaft 16 is aligned perpendicular to the swiveling axis 15 of the machining head 14, whereby the swiveling axis 15, in turn, is aligned perpendicular to the clamping plane 27.

As can especially be seen in FIG. 2, the positioning shaft 16 extends to both sides of the housing 37 of the machining head 14 and it supports the machining tools 6 to 13 at its ends 16a, 16b. In this context, tool carriers 17, 18 on which the tools 6 to 13 are held preferably so as to be replaceable are arranged at both ends 16a, 16b of the positioning shaft 16.

As shown in FIG. 2, the positioning shaft 16 has a swiveling axis 38 around which the positioning shaft 16 is arranged so as to swivel, as illustrated by the double-headed arrow labeled Q2.

As can be seen in the figures, stationary tools 10 to 13 such as, for instance, draw blades, are provided on the tool carrier 18 and motor-driven machining tools 6 to 9 are arranged at the other end 16b of the positioning shaft 16 on the tool carrier 17.

The axes 21, 22 of the motor-driven machining tools 6 to 9 can be aligned either parallel or perpendicular to the positioning shaft 16.

As can especially be seen in FIG. 2 in the embodiment selected here, two motor-powered drives 19, 20 for the machining tools 6 to 9 are provided at one end 16b, whereby said motor-powered drives are arranged one behind the other in the axial direction of the positioning shaft 16 and their tool axes are aligned at a right angle with respect to each other. The motor-powered drives 19, 20 have a continuous output shaft whose two shaft ends 23, 24 have tool holders for the rotating machining tools 6 to 9. As a result, in each case, one drive can drive two machining tools 6, 7 or 8, 9.

When it comes to positioning the positioning shaft 16, a computerized numerical control (CNC) is provided which allows a precise positioning of the tools 6 to 13.

For the machining, the frame 1 is placed into a frame plate 32 and secured with clamping means 33 and centering means 34.

The clamping means 33 can be, for example, hold-down clamps that clamp the frame 5 onto the plate 32 of the machine rack 35. There are also centering means 34 that engage with the inside of the frame 5 or of the profile legs 1 to 4 and that center the frame 5 and secure it against shifting in the clamping plane 27.

Figure 3:
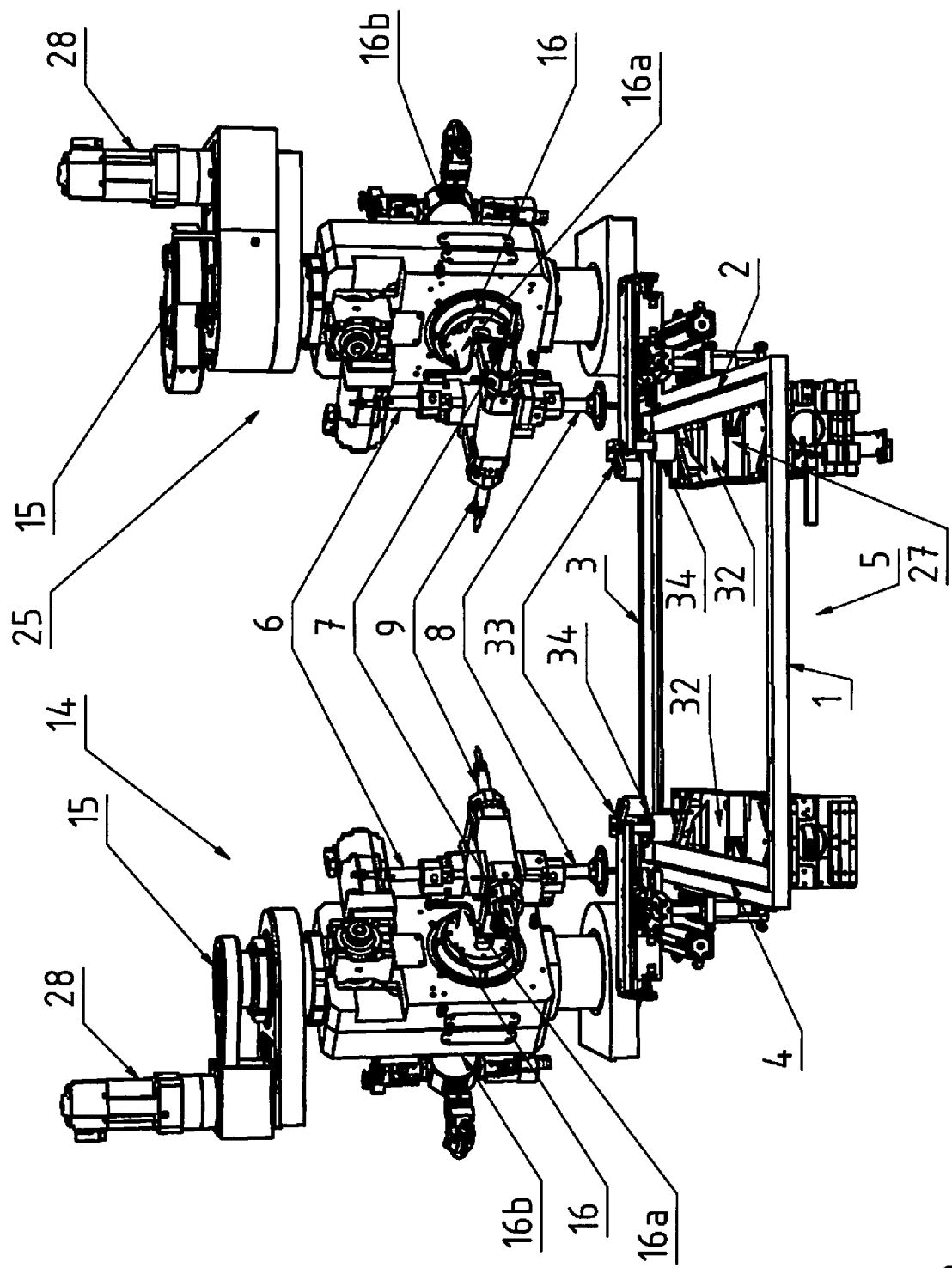

When it comes to the machining itself, the machining heads 14 are initially put into position. For this purpose, the carriages 36 that carry the appertaining machining head 14 are placed onto the frame 5 that is to be machined. Then, for example, in order for the corner to be machined, the appertaining machining head 14 is swiveled around the swiveling axis 15 diagonally to the frame, e.g. by 45°, by means of the actuating drive 28. Subsequently, preferably at the same time, the requisite tool 6 to 13 for the corner machining is selected through a rotational movement of the positioning shaft 16. FIG. 3 shows the position of the machining heads 14 for the inner corner machining using a side-and-face cutter.

Then the appropriate machining head 14 with the tools 6 to 13 is moved once again into its initial position and the next machining tool 6 to 13 is selected by rotating the positioning shaft 16 and/or by rotating the machining head 14, 25. In this context, FIG. 4 shows the machining of the frame corner with a machining tool 12 configured as a draw blade.

Figure 4:
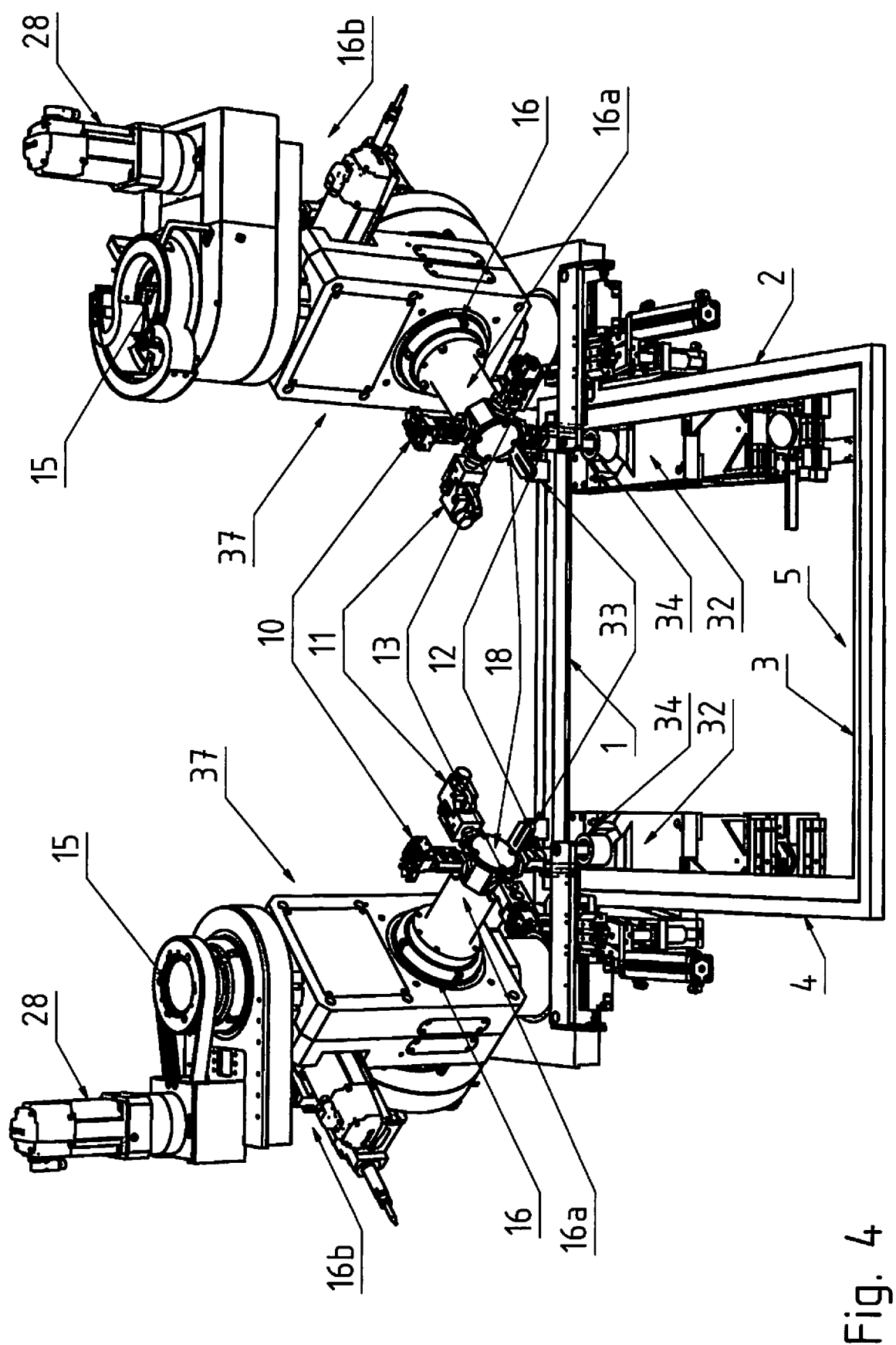
Figure 5:
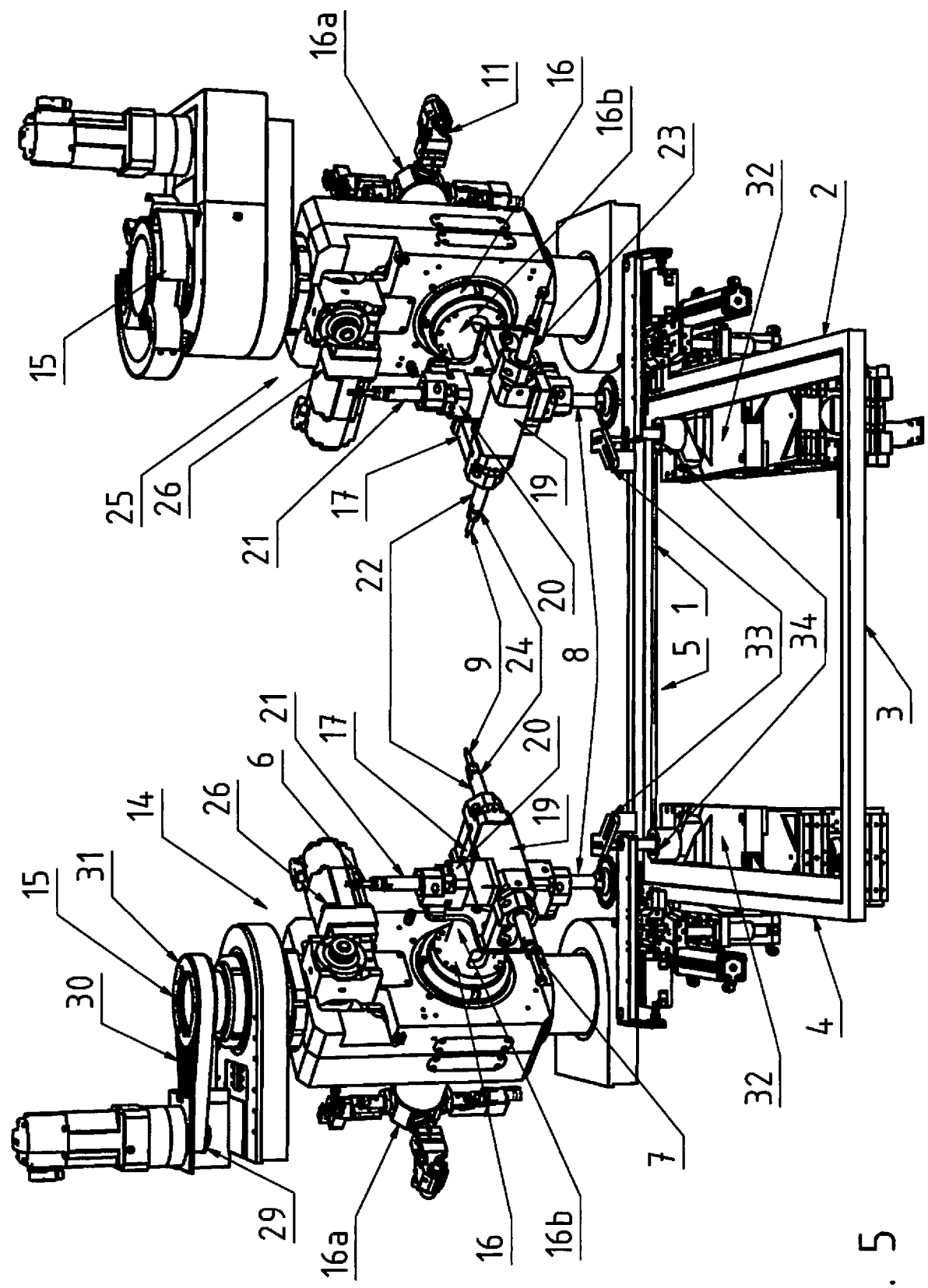

In FIG. 5, the machining heads 14, 25 have been rotated around the swiveling axis 15 by 180° in comparison to the position shown in FIGS. 3, and 4, so that now a side-and-face cutter 8 is employed for milling the inner corner.

Figure 6:
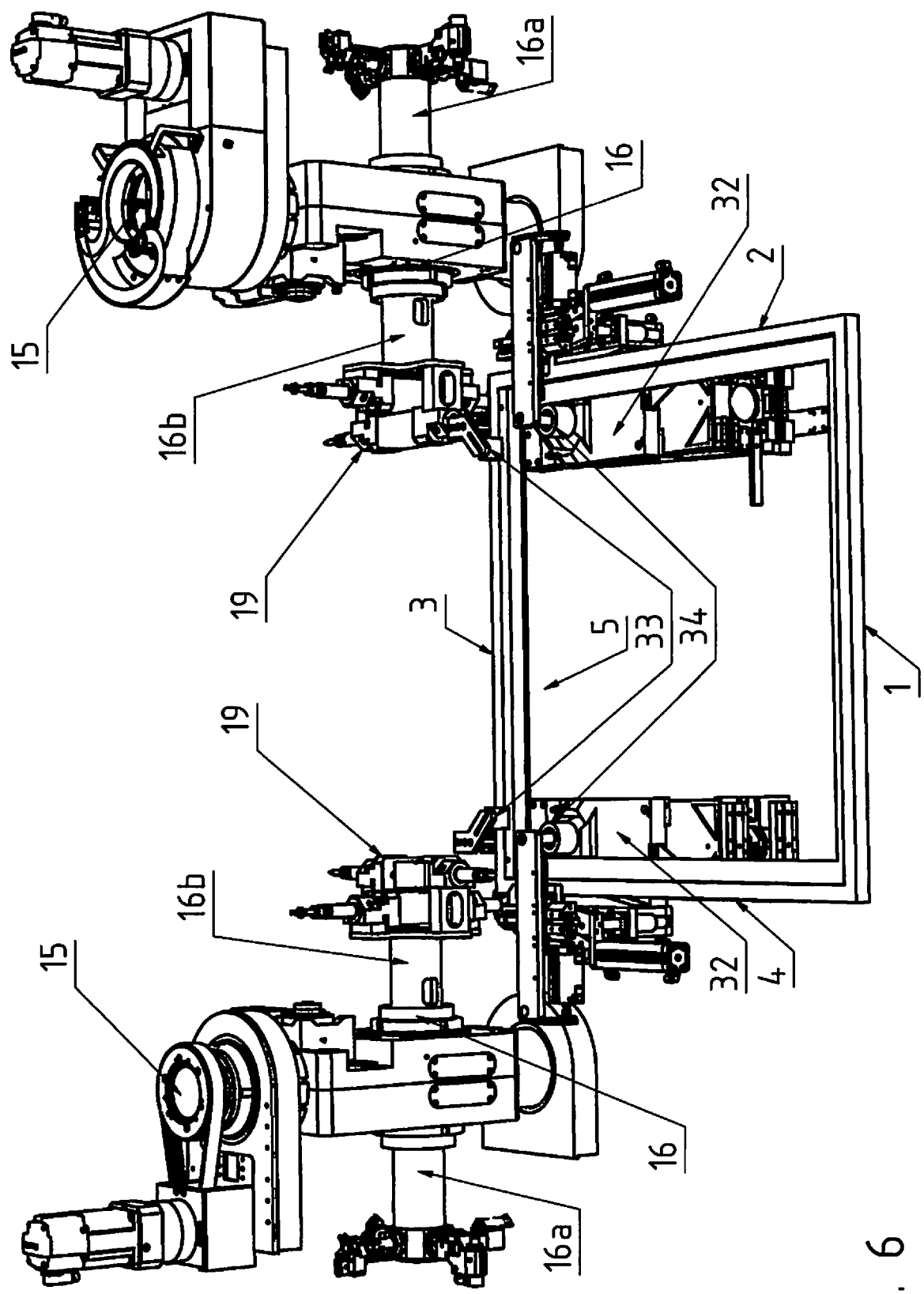

In the machining situation shown in FIG. 6, the positioning shaft 16 of the machining head 14, 25 is aligned parallel to the profile piece 2, in other words, it is swiveled once again by 45° relative to the position shown in FIG. 5, so that now a contouring milling disc or, for instance, a profiling cutter can then machine the outer contour of the frame 5.

Figure 7:
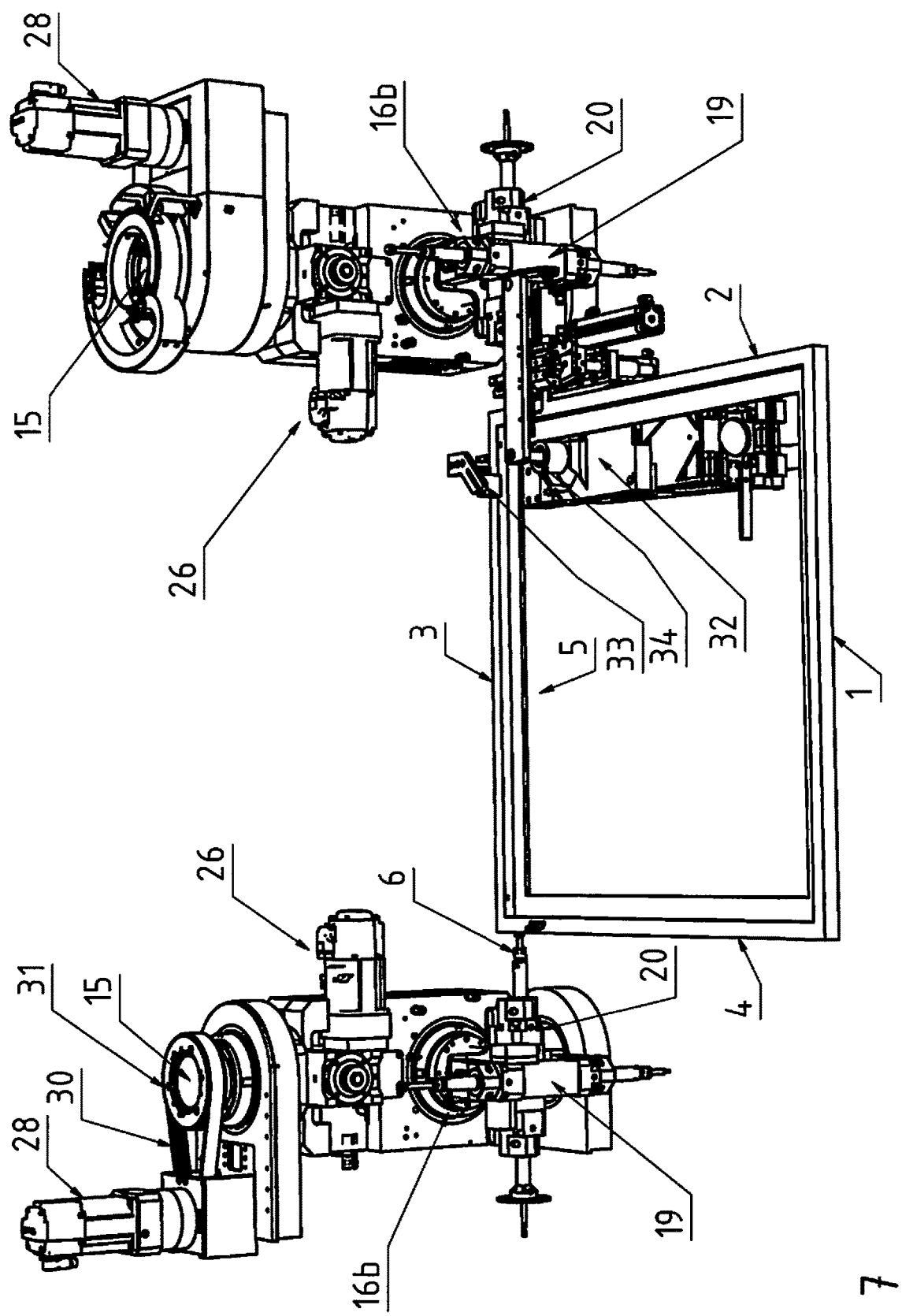

FIG. 7 shows the work steps employing other tools such as, for example, the machining of the profile piece 1 to 4 in order to create water slits along the profile piece 4 by means of a milling cutter 6.

The device according to the invention accounts for a high level of flexibility and also allows a quick adaptation of the device to a wide array of dimensions of the specific frame 5 that is to be machined.

The invention is not limited only to dual-head machining, but rather, the provision can also be made for a four-head machining device having several, especially two, machining heads 14, 25.

LIST OF REFERENCE NUMERALS 1 profile piece
2 profile piece
3 profile piece
4 profile piece
5 window or door frame
6 machining tool
7 machining tool
8 machining tool
9 machining tool
10 machining tool
11 machining tool
12 machining tool
13 machining tool
14 machining head
15 swiveling axis
16 positioning shaft
16a end of the positioning shaft
16b end of the positioning shaft
17 tool carrier 18 tool carrier
19 drive
20 drive
21 tool axis
22 tool axis
23 shaft end
24 shaft end
25 machining head
26 actuating drive
27 clamping plane
28 actuating drive
29 sprocket
30 toothed belt
31 toothed wheel
32 frame plate
33 clamping means
34 centering means
35 machine rack
36 carriage
37 housing
38 swiveling axis
X axis
Y axis
Z axis
Q1, Q2 rotating or swiveling axis

The invention claimed is:

1. A device for machining a frame welded from profile pieces, the device comprising:

at least one machining head, said at least one machining head having a swiveling axis about which the at least one machining head is adapted to be swiveled, and said at least one machining head having a positioning shaft defining a length from a first end to an opposing second end of the positioning shaft and the positioning shaft further defining a positioning shaft axis that extends parallel to the length, said positioning shaft extending through an interior of the at least one machining head such that the positioning shaft axis is arranged at an angle to the swiveling axis, with said positioning shaft having a first end area disposed at the first end of the positioning shaft and with said positioning shaft having a second end area disposed at the second end of the positioning shaft, with the first end area of the positioning shaft extending from one side of the at least one machining head and the second end area of the positioning shaft extending from an opposite side of the at least one machining head; and a plurality of machining tools arranged on the positioning shaft of the at least one machining head, with each one of said plurality of machining tools configured for being moved individually into machining position in respect of the frame upon selective positioning of the at least one machining head about the swiveling axis by a first actuator and selective rotation of the positioning shaft about the positioning shaft axis by a second actuator, wherein the plurality of machining tools comprises two or more motor-driven tools located at the first end area of the positioning shaft and splayed radially outwardly from the positioning shaft such that each of the two or more motor-driven tools is radially spaced from the positioning shaft axis, a first of the two or more motor-driven tools is driven in rotation for machining of the frame by a first motor-powered drive located at the first end area, and a second of the two or more motor-driven tools is driven in rotation for machining of the frame by a second motor-powered drive located at the first end area, wherein the plurality of machining tools further comprises two or more non-rotary tools located at the second end area of the positioning shaft and splayed radially outwardly from the positioning shaft such that each of the two or more non-rotary tools is radially spaced from the positioning shaft axis, wherein each one of the plurality of machining tools defines a respective machining tool axis and wherein each corresponding machining tool axis of the plurality of machining tools is aligned perpendicular to the positioning shaft axis.

2. The device according to claim 1, further comprising an actuating drive configured to control rotational orientation of the positioning shaft.

3. The device according to claim 1, wherein the frame defines a clamping plane, the swiveling axis of the at least one machining head is aligned perpendicular to the clamping plane for the frame, and the positioning shaft axis is aligned parallel to the clamping plane.

4. The device according to claim 1, wherein the at least one machining head can be moved in directions along three axes (X, Y, Z).

5. The device according to claim 1, further comprising a plurality of tool carriers, with at least a first tool carrier of the plurality of tool carriers arranged at the first end area of the positioning shaft and with at least a second tool carrier of the plurality of tool carriers arranged at the second end area of the positioning shaft.

6. The device according to claim 1, wherein at least one machining tool of the plurality of machining tools projects away from the positioning shaft in the respective first end area or the respective second end area of the positioning shaft in which the at least one machining tool is located.

7. The device according to claim 1, wherein each respective motor-powered drive has a corresponding output shaft with tool holders for rotating one or more of the motor-driven tools of the plurality of machining tools arranged at the first end area.

8. The device according to claim 1, wherein the first motor-powered drive and the second motor-powered drive are arranged one behind the other with respect to the positioning shaft axis of the positioning shaft.

9. The device according to claim 1, wherein the positioning shaft is positioned employing computerized numerical control (CNC).

10. The device according to claim 1, further comprising a second machining head, so that the at least one machining head machines a respective one of the corners and/or side profiles of the frame while the second machining head simultaneously machines a respective other one of the corners and/or side profiles of the frame.

11. The device according to claim 1, further comprising a carriage on which the at least one machining head is mounted, wherein said carriage is configured for movement in directions along three axes (X, Y, Z).

* * * * *